United States Patent
Dang et al.

(10) Patent No.: US 9,563,849 B2
(45) Date of Patent: Feb. 7, 2017

(54) BEHAVIORAL RULES DISCOVERY FOR INTELLIGENT COMPUTING ENVIRONMENT ADMINISTRATION

(71) Applicant: BMC SOFTWARE, INC., Houston, TX (US)

(72) Inventors: Derek Dang, San Jose, CA (US); Bharat Mitbander, Austin, TX (US)

(73) Assignee: BMC SOFTWARE, INC., Houston, TX (US)

( * ) Notice: Subject to any disclaimer, the term of this patent is extended or adjusted under 35 U.S.C. 154(b) by 0 days.

(21) Appl. No.: 14/947,625

(22) Filed: Nov. 20, 2015

(65) Prior Publication Data

US 2016/0078356 A1    Mar. 17, 2016

Related U.S. Application Data

(63) Continuation of application No. 13/795,071, filed on Mar. 12, 2013, now Pat. No. 9,195,943.

(51) Int. Cl.
   *G06N 5/04* (2006.01)
   *G06N 5/02* (2006.01)

(52) U.S. Cl.
   CPC .............. *G06N 5/046* (2013.01); *G06N 5/025* (2013.01)

(58) Field of Classification Search
   CPC ........................................................ G06N 5/025
   See application file for complete search history.

(56) References Cited

U.S. PATENT DOCUMENTS

| 7,076,695 | B2 | 7/2006 | McGee et al. |
| 9,195,943 | B2 | 11/2015 | Dang et al. |
| 2002/0111755 | A1 | 8/2002 | Valadarsky et al. |
| 2002/0152185 | A1 | 10/2002 | Satish Jamadagni |
| 2005/0157654 | A1* | 7/2005 | Farrell ............... H04L 41/0213 370/241 |
| 2008/0016115 | A1* | 1/2008 | Bahl ...................... H04L 41/22 |
| 2010/0198776 | A1* | 8/2010 | Wang .................... G06Q 10/00 706/58 |
| 2011/0161048 | A1 | 6/2011 | Sodem et al. |
| 2011/0238376 | A1 | 9/2011 | Dang et al. |
| 2011/0238377 | A1 | 9/2011 | Scarpelli et al. |
| 2012/0137367 | A1 | 5/2012 | Dupont et al. |
| 2014/0279797 | A1 | 9/2014 | Dang et al. |

FOREIGN PATENT DOCUMENTS

WO    2012038949 A1    3/2012

OTHER PUBLICATIONS

Non-Final Office Action for U.S. Appl. No. 13/795,071, mailed Apr. 6, 2015, 7 pages.
Notice of Allowance for U.S. Appl. No. 13/795,071, mailed Jul. 17, 2015, 5 pages.

* cited by examiner

*Primary Examiner* — Alan Chen
(74) *Attorney, Agent, or Firm* — Brake Hughes Bellermann LLP

(57) ABSTRACT

A management system for determining causal relationships among system entities may include a causal relationship detector configured to receive events from a computing environment having a plurality of entities, and detect causal relationships among the plurality of entities, during runtime of the computing environment, based on the events, and a rules converter configured to convert one or more of the causal relationships into at least one behavioral rule. The at least one behavioral rule may indicate a causal relationship between at least two entities of the plurality of entities.

19 Claims, 6 Drawing Sheets

BEHAVIORAL RULES DISCOVERY FOR INTELLIGENT COMPUTING ENVIRONMENT ADMINISTRATION

RELATED APPLICATION

This application is a continuation of U.S. application Ser. No. 13/795,071, filed Mar. 12, 2013, entitled "Behavioral Rules Discovery For Intelligent Computing Environment Administration", the contents of which is hereby incorporated by reference in its entirety.

TECHNICAL FIELD

The present disclosure relates generally to determining behavioral relationships among resources within a computing environment.

BACKGROUND

A management system may include functionalities that are designed to monitor and track relationships, in the forms of models, among logical and physical resources of a computing environment. These relationship models may provide a priori knowledge of how resources within the computing environment are interconnected. The management system may use these relationship models to reduce management activities, and simplify troubleshooting procedures, when errors occur. For example, a relationship model may provide information regarding the connectivity of a set of devices to the rest of the infrastructure via a switch, and information regarding the effect on the devices when the switch is rendered inoperable, e.g., all devices connected to the switch create alarms. The management system may use this relationship information to suppress the noise (e.g., the multiple alarms created by all of the affected devices) and to provide information that indicates that the switch is inoperable.

However, in today's large, dynamic and (often) cloud-based environment, the inter-entity relationship/interaction model becomes expensive and difficult to maintain and it is also frequently difficult or impossible to anticipate all possible dependencies that might arise. Conventional management systems may only provide basic management functionalities with minimal aid of machine intelligence, in the form of static rules, e.g., previously known static relationships. Because infrastructures are poised to grow exponentially, administrators' inability to effectively manage them becomes more amplified.

SUMMARY

The embodiments provide a mechanism to automatically determine causal relationships in a dynamic environment where existing relationship models may not be available or may be inadequate to reflect the full extent of the inter dependencies or to adapt with the changing complexity of the runtime dynamics.

For example, the embodiments may provide a management system for determining causal relationships among system entities. The management system may include at least one processor, and a non-transitory computer-readable storage medium including instructions executable by the at least one processor. The instructions are configured to implement a causal relationship detector, and a rules converter. The causal relationship detector is configured to receive events from a computing environment having a plurality of entities, and configured to detect causal relationships among the plurality of entities, during runtime of the computing environment, based on the events. The rules converter is configured to convert one or more of the causal relationships into at least one behavioral rule, where the at least one behavioral rule indicates a causal relationship between at least two entities of the plurality of entities.

The causal relationship detector may include a graph generator configured to generate one or more graphs based on the events. Each graph may include vertices and arcs connecting temporally adjacent vertices. Each vertex may represent an event instance of one or more events, and each arc may represent a level of causal connectivity between at least two vertices. The causal relationship detector may be configured to detect the causal relationships based on the one or more graphs, where at least two connected vertices may represent the causal relationship between a set of entities.

The event instance may include a creation of the one or more events, a closure of the one or more events, or an absence of the one or more events where a pattern of appearance has been established.

The causal relationship detector may include a graph generator configured to generate a graph based on the events. The graph generator may include a vertex classifier configured to create vertices based on an initial set of events including a first vertex, a second vertex, and a third vertex. The vertex classifier may be configured to arrange the first vertex, the second vertex, and the third vertex in chronological order. The graph generator may include an arc classifier configured to create arcs between temporally adjacent vertices including a first arc connected between the first vertex and the second vertex and a second arc connected between the second vertex and the third vertex. The arc classifier may be configured to annotate each arc with a coefficient value representing a level of connectivity between the temporally adjacent vertices.

The arc classifier may be configured to receive a relationship model providing at least one known relationship between the plurality of entities, and the arc classifier may be configured to strengthen at least one arc of the graph based on the at least one known relationship.

The graph generator may be configured to update the graph based on a secondary set of events. For example, the arc classifier may be configured to strengthen or weaken the arcs of the graph based on, in part, a presence or absence of a repeat pattern of vertices associated with the secondary set of events.

Each vertex may be represented by a string representation, and the arc classifier may be configured to analyze the repeat pattern of vertices by searching the graph for a match with a search pattern that includes a concatenation of string representations corresponding to at least two temporally adjacent vertices associated with the secondary set of sets.

Each arc may be associated with a time limit and the time limit may be dependent upon the coefficient value. The causal relationship detector may include a pruner unit configured to remove at least one arc from the graph when the time limit associated with the at least one arc has been exhausted, and remove at least one vertex when the at least one vertex is not connected to any other vertex.

The rules converter may be configured to map at least two entities of the plurality of entities to the at least two vertices, and generate the at least one behavior rule that specifies the causal relationship between the at least two entities.

The embodiments may provide a non-transitory computer-readable medium storing instructions that when executed cause at least one processor to determine causal relationships among system entities. The instructions may include instructions to receive events from a computing environment having a plurality of entities, and detect causal relationships among the plurality of entities, during runtime of the computing environment, based on the events, and convert one or more of the causal relationships into at least one behavioral rule. The at least one behavioral rule may indicate a causal relationship between at least two entities of the plurality of entities.

The instructions to detect causal relationships among the plurality of entities, during runtime of the computing environment, based on the events may include instructions to generate one or more graphs based on the events. Each graph may include vertices and arcs connecting temporally adjacent vertices, each vertex may represent an event instance of one or more events, and each arc may represent a level of causal connectivity between at least two vertices. The instructions may include instructions to detect the causal relationships based on the one or more graphs, where at least two connected vertices represents the causal relationship between a set of entities.

The event instance may include a creation of the one or more events, a closure of the one or more events, or an absence of the one or more events where a pattern of appearance has been established.

The instructions may include instructions to generate a graph including create vertices based on an initial set of events including a first vertex, a second vertex, and a third vertex, and arrange the first vertex, the second vertex, and the third vertex in chronological order, create arcs between temporally adjacent vertices including a first arc connected between the first vertex and the second vertex and a second arc connected between the second vertex and the third vertex, and annotate each arc with a coefficient value representing a level of connectivity between the temporally adjacent vertices.

The instructions may include instructions to receive a relationship model providing at least one known relationship between the plurality of entities, and strengthen at least one arc of the graph based on the at least one known relationship.

The instructions may include instructions to update the graph based on a secondary set of events including strengthening or weakening the arcs of the graph based on, in part, a presence or absence of a repeat pattern of vertices associated with the secondary set of events.

Each vertex may be represented by a string representation, and the instructions to update the graph may include analyze the repeat pattern of vertices by searching the graph for a match with a search pattern that includes a concatenation of string representations corresponding to at least two temporally adjacent vertices associated with the secondary set of sets.

Each arc may be associated with a time limit and the time limit may be dependent upon the coefficient value. The instructions to update the graph may include remove at least one arc from the graph when the time limit associated with the at least one arc has been exhausted, and remove at least one vertex when the at least one vertex is not connected to any other vertex.

The embodiments provide a method for determining causal relationships among system entities. The method may include receiving, by at least one processor, events from a computing environment having a plurality of entities, and detecting, by at least one processor, causal relationships among the plurality of entities, during runtime of the computing environment, based on the events. The method may further include converting, by the at least one processor, one or more of the causal relationships into at least one behavioral rule, where the at least one behavioral rule indicates a causal relationship between at least two entities of the plurality of entities.

The method may further include generating one or more graphs based on the events. Each graph may include vertices and arcs connecting temporally adjacent vertices. Each vertex may represent an event instance of one or more events. Each arc may represent a level of causal connectivity between at least two vertices. The method may include detecting the causal relationships based on the one or more graphs, where at least two connected vertices represents a causal relationship between a set of entities. The event instance may include a creation of the one or more events, a closure of the one or more events, or an absence of the one or more events where a pattern of appearance has been established.

DESCRIPTION OF EXAMPLE EMBODIMENTS

Figure 1:
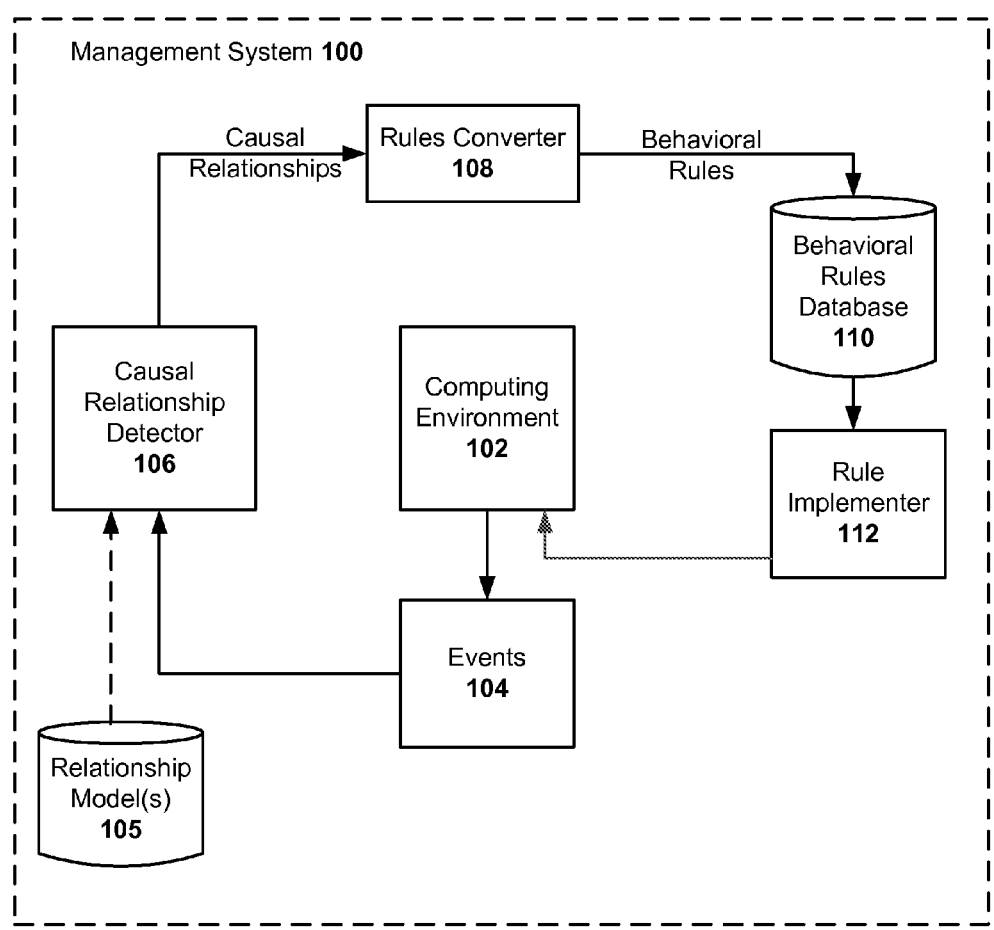
FIG. 1 illustrates a management system for determining causal relationships among physical/logical entities in a computing environment according to an embodiment.

The embodiments provide a causal relationship detector that is configured to dynamically detect causal relationships among entities within one or more systems, at runtime. Further, the causal relationship detector may automatically discover these causal relationships without relying on existing relationship models. For example, the causal relationship detector may deduce causal relationships among entities without having any prior knowledge of how the entities are logically or physically related to each other by determining the runtime behavior characteristics of the system(s). However, according to one implementation, it is noted that the determination of causal relationships among entities may be enhanced with existing relationship models.

Also, in contrast to some conventional approaches, the causal relationship detector detects causal relationships, which may be considered more definite than relationships based on correlation techniques. For example, for any two correlated events A and B, the following relationships are possible: A causes B; B causes A; A and B are consequences of a common cause, but do not cause each other; and no connection exists between A and B, where the correlation is coincidental. As such, correlation does not necessarily imply causation. With respect to causation, the following situations may apply for these two correlated events: A may be the cause of B, B may be the cause of A; and some unknown third factor C may actually be the cause of both A and B.

A causal relationship may be a relationship between an event (e.g., the cause) and a second event (e.g., the effect), where the second event is understood as a consequence of the first event. When an event produced by a first entity causes a subsequent event produced by a second entity, a causal relationship may exist between the first entity and the second entity. As such, causal relationships may be considered more definite than correlation relationships since the causes and effects have been established. However, it is noted that the detection of relationships among entities by the causal relationship detector may be enhanced with any type of correlation analysis including the detection of correlation relationships.

Often times, in a large computing environment, the causal relationships between entities may be difficult to determine or are simply unknown because of the vast number of entities (or components). A dynamically changing environment, such as the cloud, also adds to the complexity of determining such relationships. Additionally, a dynamic environment introduces implicit dependencies or relationships between entities in seemingly unrelated systems by virtue of the runtime characteristics of deployment on shared infrastructure which would be impossible to predict or model in a static manner. As such, the causal relationship detector may be able to detect the causal relationships among entities across multiple software systems, even under conditions as described above. Then, behavior rules may be established from the determined causal relationships, which may provide conditions on which certain actions may be performed.

In one example, it may not be entirely clear that a run-away process on a middle tier of a solution stack A (e.g., utilization is at 100%) may have an adverse effect on a web server of a solution stack B such as creating a slow web response time. However, the causal relationship detector may detect a causal relationship that a CPU-related event on the middle tier of the solution stack A always creates a slow response on the web server of the solution stack B. This causal relationship may be converted into a behavioral rule, which could be used to send a prediction notification to warn that web responses are going to be slow. These and other features are further described with respect to the figures.

FIG. 1 illustrates a management system 100 for determining causal relationships among entities in a computing environment 102 according to an embodiment. For example, the management system 100 may include a computing environment 102 that generates events 104 when certain conditions are satisfied, a database storing one or more existing relationship models 105, a causal relationship detector 106 that detects causal relationships among the entities of the computing environment 102 during runtime of the computing environment 102 based on the events 104 (and optionally the relationship model(s) 105), a rules converter 108 that converts the causal relationships into behavioral rules, a behavioral rules database 110 that stores the behavioral rules, and a rule implementer 112 that implements the behavioral rules. The management system 100 may include other components that are well known to one of ordinary skill in the art.

The computing environment 102 may include a plurality of entities, where the plurality of entities may include logical and physical entities. For example, the entities may be computer systems, computer components, hardware/software resources, processors, web servers, application servers, databases, virtual machines, storage devices, applications, operating systems, or generally any type of component that can be used within computing systems. Also, the entities of the computing environment 102 may be part of the same system or may be distributed across many different systems. In this context, the entities of the computing environment 102 may belong to different systems having different administrators.

The computing environment 102 may be configured to generate events 104 during runtime of the computing environment 102. For example, the computing environment 102 may create and collect many types of events 104 as a consequence of the computing environment 102 being included in the management system 100. These generated events 104 may be stored in a database associated with the computing environment 102 and/or the management system 100.

Generally, each event 104 may denote a singularity that signifies fulfillment of a condition. In more detail, the events 104 may include, but are not limited to, abnormalities (e.g., a marker for an out-of-the-ordinary circumstance occurrence), alarms (e.g., a condition where a known performance threshold has been surpassed), configuration log entries, configuration change events, and/or big data analysis entries. Also, each event 104 may include identification information identifying the particular entity associated with generating the corresponding event 104, event information that provides details on the condition and the fulfillment of the condition such as any relevant performance metrics, and timing information that providing the time of when the event 104 was created by the particular entity (e.g., when the condition was fulfilled). Also, each event 104 may include other types of information known to one of ordinary skill in the art.

In one specific example, the computing environment 102 may include a web server as a first logical entity and a middle tier as a second logical entity. When a certain condition associated with the first logical entity is reached (e.g., CPU usage is above a threshold value), the first logical entity may generate an event 104 corresponding to this condition. This event 104 may identify the first logical entity, and provide information regarding the threshold value, the current CPU usage of the first logical entity, and the time when the event 104 was created. Similarly, when a certain condition associated with the second logical entity is reached (e.g., a database write exceeds the baseline), the second logical entity may generate an event 104 corresponding to this condition. This event 104 may identify the second logical entity, and provide information regarding the baseline value, the current database write levels, and the time when the event 104 was created.

Conventionally, the management system 100 may attempt to reduce, organize, and present the events 104 for the purpose of measuring fractional or overall system health. However, according to the embodiments, the causal relationship detector 106 may analyze the events 104 to determine how the events 104 are possibly connected so that computing environment 102 can be administered more intelligently and proactively.

The causal relationship detector 106 may receive the events 104 from the computing environment 102, and may detect causal relationships among the plurality of entities of the computing environment 102, during runtime of the computing environment 102, based on the events 104. The details of the causal relationship detector 106 are further explained with reference to FIG. 3.

However, generally, the causal relationship detector 106 may periodically analyze sets of events 104 that are generated by the computing environment 102, and, based on the occurrence/disappearance/absence of these events 104, the causal relationship detector 106 may determine and track repeat patterns of behavior associated with the entities that generated these event instances. Then, the causal relationship detector 106 may detect the causal relationships among the entities of the computing environment 102 using the determined patterns of behavior. For example, the causal relationship detector 106 may determine that every time an occurrence of a first event 104 (produced by a first entity) has occurred, this occurrence is usually followed by an occurrence of a second event 104 (produced by a second entity) within a relatively short time interval. In this case, the causal relationship detector 106 may determine that the first entity is causally linked to the second entity, e.g., a causal relationship exists between the first entity and the second entity.

In one implementation, the causal relationship detector 106 may create one or more graphs using the received events 104. The graphs may be directed graphs, acyclic directed graphs, or generally any type of graphical representation plotting elements and connections between elements. In one example, the causal relationship detector 106 may create a vertex (e.g., a marker) for the occurrence, disappearance and/or absence of an individual event 104 or a group of events 104, arrange the vertices in temporal order of when the event instances (e.g., the occurrence, disappearance and/or absence) have occurred, and place arcs between temporally adjacent vertices. Also, it is noted that although this disclosure describes the graphs in terms of vertices and arcs, other similar graphical elements may be used to represent this information such as nodes, points, objects, elements, lines, edges, arrows, connections, and links, for example.

The causal relationship detector 106 may annotate each arc with a coefficient value that represents the level of causal connectivity between two vertices. In one example, when the causal relationship detector 106 processes an initial set of events 104, the causal relationship detector 106 may create arcs between temporally adjacent vertices, and annotate each arc with a relatively low coefficient value since repeat patterns of behavior have not necessarily been established. Subsequently, the causal relationship detector 106 may strengthen or weaken the arcs by adjusting the coefficient value to one of a higher value or a lower value depending on the analysis of other subsequently received events 104.

As such, over time, as the causal relationship detector 106 periodically receives more and more events 104 from the computing environment 102, the causal relationship detector 106 may be able to determine repeat patterns of vertices (e.g., whether pairs of the same vertices have previously occurred in some type of order), and then may update the one or more graphs by strengthening or weakening the coefficient values of the arcs based on a presence or absence of the repeat patterns of vertices, and removing exhausted arcs and vertices from the graphs. Once the coefficient value of an arc exceeds a threshold value, the causal relationship detector 106 may determine that a causal relationship exists between the connected vertices (e.g., a first vertex and a second vertex with an arc having a coefficient value exceeding a threshold value). The existence of the causal relationship between the connected vertices implies that the entity associated with the creation of the first vertex, and the entity associated with the creation of the second vertex, are causally linked.

In one implementation, each determined causal relationship may specify causation information providing how an entity or group of entities is causally linked to another entity or group of entities. For example, the causation information may include any relevant information that caused a subsequent effect, and the relevant information concerning details of the subsequent effect. In more detail, the causation information may include parameters and/or metrics associated with an entity or group of entities that caused the subsequent effect on the linked entity/entities, and the parameters and/or metrics of the linked entity/entities that occurred as a result.

With respect to a specific example, a determined causal relationship may indicate the following: a CPU-related event on the middle tier of the solution stack A created a slow response on the web server of the solution stack B. In this example, the causation information may provide the link between the CPU-related event on the middle tier of the solution stack A and the slow response on the web server of the solution stack B, as well as the performance metrics of stack A's middle tier that caused the slow response on stack B's web server, and the performance metrics of stack B's web server concerning the slow response.

Using these techniques, the causal relationship detector 106 may automatically discover the causal relationships without relying on the existing relationship models 105. For example, the causal relationship detector 106 may deduce the causal relationships among the entities without having any prior knowledge of how the entities are logically or physically related to each other. In other words, the causal relationship detector 106 may build a relationship model of the computing environment 102 based on the runtime characteristics of the computing environment 102.

According to another implementation, the causal relationship detector 106 may utilize at least one existing relationship model 105 to enhance the detection of the causal relationships. For example, the causal relationship detector 106 may receive one or more existing relationship models 105, and determine the causal relationships based on the events 104 and the one or more existing relationship models 105.

An existing relationship model 105 may include information regarding one or more known static relationships among entities of the computing environment 102. For example, the existing relationship model 105 may specify how physical/logical entities are connected to each other, and/or any type of known correlation/causation relationships including information specifying how certain conditions in one entity or group of entities affects other entities. Within an enterprise, different people or different organizational units may create a separate relationship model 105 specifying one or more known relationships among the entities, which may differ depending on their expertise. For example, one relationship model 105 may be focused on the relationships between software resources, and another relationship model 105 may be focused on the relationships between hardware resources.

In one implementation, the causal relationship detector 106 may receive one or more existing relationship models 105, and then identify the entities within these one or more existing relationship models 105 that correspond to the entities associated with the vertices on the graph. If the entities associated with temporally adjacent vertices have an existing known relationship as specified by the relationship model 105, the causal relationship detector 106 may strengthen the arc between these temporally adjacent vertices by increasing its coefficient value to a higher value. Further, according to one example, the increased amount may be dependent upon the strength of the existing known relationship.

The rules converter 108 may receive the causal relationships from the causal relationship detector 106, and may convert one or more of the causal relationships into at least one behavioral rule indicating a causal relationship between at least two entities. According to one aspect, the rules converter 108 may be configured to map the connected vertices (e.g., a first vertex being connected to a second vertex with its connection strength above a threshold value) to the entities that generated the conditions for the connected vertices to appear in the first place.

As indicated above, the causal relationship detector 106 may detect causal relationships among connected vertices using the graph(s). The existence of the causal relationship between the connected vertices may imply that the entity (or group of entities) associated with the creation of the first vertex, and the entity (or group of entities) associated with the creation of the second vertex, are causally linked. However, at this point, the actual physical/logical entities are not mapped to connected vertices. As such, the rules converter 108 may be configured to map the connected vertices to the entities associated with the connected vertices.

Generally, a behavioral rule may specify an obligation concerning a certain action to be performed by the computing environment 102 when a condition is fulfilled. Therefore, according to another aspect, the rules converter 108 may include logic that determines behavioral rules from determined relationship information according to any type of technique known in the art.

In yet another aspect, based on the causation information from a determined causal relationship, the rules converter 108 may generate an obligation concerning a certain action to be taken when characteristics of an entity (or group of entities) satisfies a condition (e.g., an entity's utilization is at 100%) in order to alleviate the effect on the computing system 102 produced by the linked entity (e.g., slow response time on the web server) when the condition is satisfied since it is known from the causal relationship that these entities are linked in such a manner. The rules converter 108 may determine any type of action that attempts to alleviate the effect on the computing environment 102 such as reassigning computing resources, transmitting a notification to interested parties, disabling certain computing resources, adding certain computing resources, etc. However, the embodiments encompass any type of action that may be taken within the computing environment 102.

Generally, based on the causal relationships, the rules converter 108 may be configured to generate one or more behavioral rules, where each behavioral rule may specify a condition and an action to be taken in the situation that the condition is satisfied.

The behavioral rules database 110 may store the behavioral rule(s) from the rules converter 108. Then, the rule implementer 112 may be configured to implement the behavioral rules to manage the computing environment 102. For example, the rule implementer 112 may be configured to monitor performance of the computing environment 102 including the performance of at least some of the physical/logical resources of the computing environment 102. In one example, the rules implementer 112 may be configured to receive performance metrics associated with various physical/logical resources, and apply these performance metrics to the stored behavioral rules. If the received performance metrics satisfies any of the conditions specified by the behavioral rules, the rules implementer 112 may be configured to instruct the computing environment 102 to take the appropriate action(s) as specified by the behavioral rules.

Figure 2:
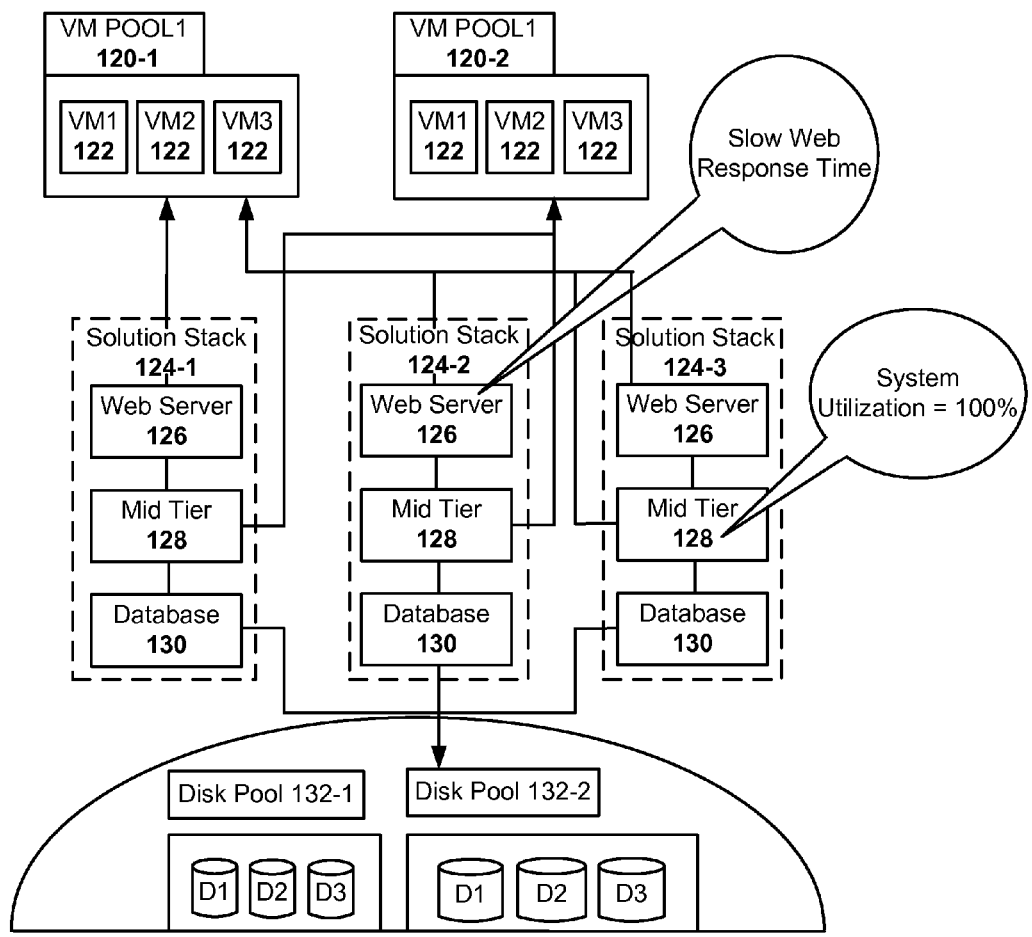
FIG. 2 illustrates an example of the computing environment of FIG. 1 according to an embodiment.

FIG. 2 illustrates the computing environment 102 according to an embodiment. However, it is noted that the computing environment 102 depicted in FIG. 2 is merely an example, where the computing environment 102 may include any type and/or arrangement of entities known to one of ordinary skill in the art. In the example of FIG. 2, the computing environment 102 may include a plurality of physical and logical entities such virtual machine (VM) pools 120 each having a plurality of VMs 122, solution stacks 124 each having a web server 126, middle tier 128, and a database 130, and disk pools 132 each having storage drives D1-D3. For example, the computing environment 102 may include three groupings of resources—disk pools 132 (physical entities), solution stacks 124 (logical entities), and VM pools 120 (physical/logical entities).

As shown in FIG. 2, the VM pools 120 may include a first VM pool 120-1 having a plurality of first VMs 122, and a second VM pool 120-2 having a plurality of second VMs 122. The solution stacks 124 may include a first solution stack 124-1, a second solution stack 124-2, and a third solution stack 124-3, where each of the first solution stack 124-1, the second solution stack 124-2, and the third solution stack 124-3 may include the web server 126, the middle tier 128, and the database 130. The disk pools 132 may include a first disk pool 132-1 and a second disk pool 132-2, where each of the first disk pool 132-1 and the second disk pool 132-2 may include a plurality of storage drives D1-D3.

In practice, the three set of resources (e.g., the VM pools 120, the solution stacks 124, and the disk pools 132) are typically not managed by the same software system. In fact, these resources may be managed by different administrators. Therefore, it is not entirely clear that a run-away process in the middle tier 128 of the third solution stack 124-3 (e.g., utilization is at 100%) may have an adverse effect on the performance of the web server 126 on the first solution stack 124-1 or the second solution stack 124-2 (e.g., slow web response time). However, over time, the causal relationship detector 106 may be able to deduce a causal connection that a CPU-related event 104 on the middle tier 128 of the third solution stack 124-3 creates a slow response on the web server 126 of the second solution stack 124-2, as further explained with reference to FIG. 3.

Figure 3:
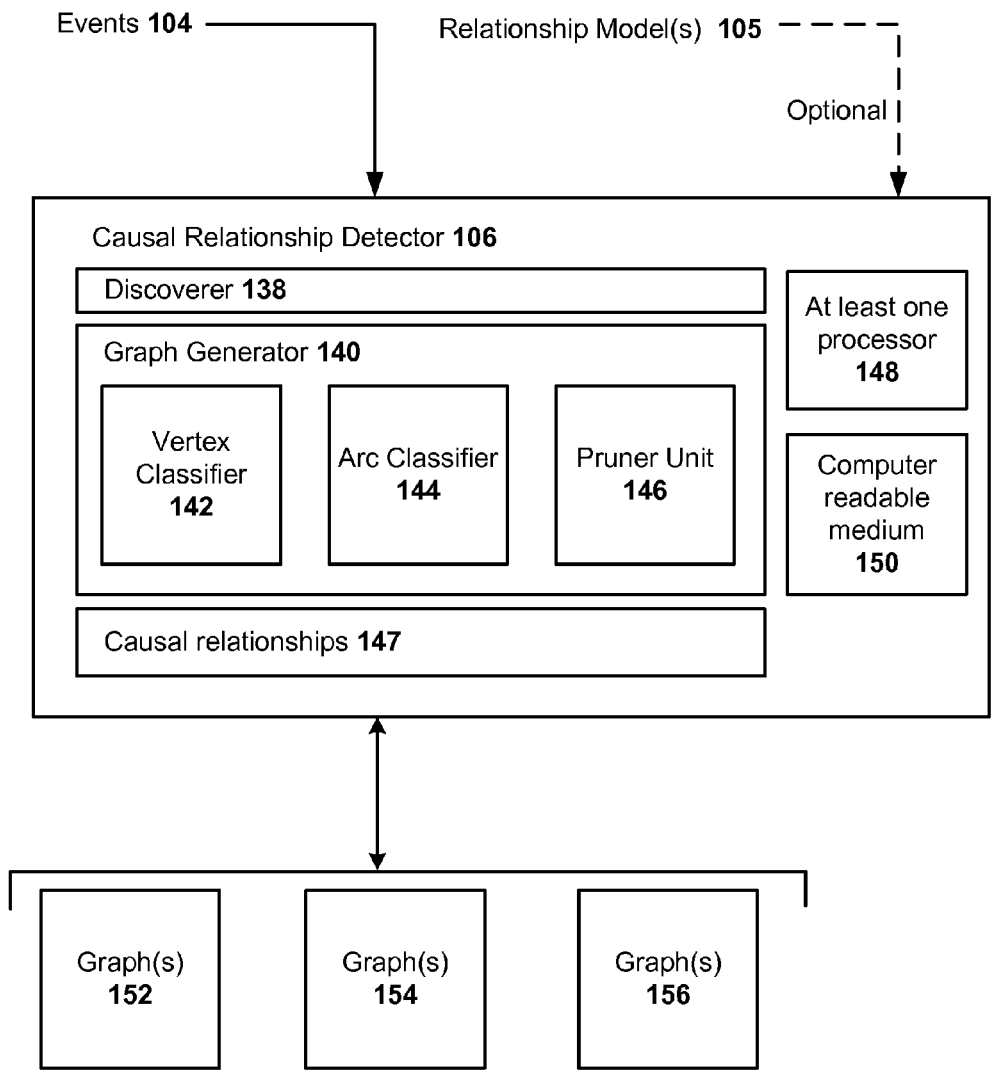
FIG. 3 illustrates an example of a causal relationship detector according to an embodiment.

FIG. 3 illustrates an example of the causal relationship detector 106 according to an embodiment. According to one aspect, the causal relationship detector 106 may receive the events 104, and generate one or more graphs such as graph 152 (FIG. 4), graph 154 (FIG. 5), and/or graph 156 (FIG. 6), based on the events 104. Then, the causal relationship detector 106 may deduce causal relationships 147 between the logical/physical entities of the computing environment 102 based on the generated graph(s), as further described below. Also, the detection of the causal relationships may be enhanced with existing relationship models 105. For example, the causal relationship detector 106 may receive one or more existing relationship models 105, and determine the causal relationships based on the events 104 and the one or more existing relationship models 105.

The causal relationship detector 106 may include a discoverer 138 that initiates the causal relationship analysis, and a graph generator 140 that generates the graphs (152, 154, 156) and determines the causal relationships 147 from the graphs. Also, the causal relationship detector 106 may include at least one processor 148, and a non-transitory computer readable medium 150. The non-transitory computer readable medium 150 may include instructions, when executed by the at least one processor 148, cause the at least one processor 148 to implement the components/functionalities of the causal relationship detector 106 (and the rules converter 108) as described herein.

The discoverer 138 may be considered the overall driver that may control and use the components of the causal relationship detector 106. In one example, the discoverer 138 may be configured to obtain the events 104 that are available for processing, and start the causal relationship analysis. For example, the discoverer 138 may be configured to periodically start the causal relationship analysis in order to analyze a set of events 104. In particular, the discoverer 138 may prompt the causal relationship analysis to execute at specified times, when the collected events 104 reaches a certain threshold number, or in response to a causal relationship analysis request received from an operator of the management system 100. During each iteration, the discoverer 138 may obtain the current set of events 104 to be analyzed. Also, along with obtaining the set of events 104 to be analyzed, the discoverer 138 may obtain any previous relationship information (graphs) as generated by the graph generator 140 and/or any relevant existing relationship models 105.

For example, for each set of events 104 to be analyzed, the discoverer 138 may obtain any previous graphs determined by the graph generator 140, and, optionally, may obtain the existing relationship models 105 (if available) to be incorporated into the causal relationship analysis. For example, when the discoverer 138 starts the initial causal relationship analysis, the discoverer 138 may obtain an initial set of events 104 to be analyzed. Then, the graph generator 140 may generate an initial graph (graph 152) based on the initial set of events 104. During the next iteration, the discoverer 138 may obtain a secondary set of events 104 to be analyzed. Then, the graph generator 140 may update the initial graph to generate the graph 154. During each subsequent iteration, the graph generator 140 may receive the new set of events 104 to be analyzed from the discoverer 138, and may update the previous graph(s), which, over time, may generate the graph 156 (which is actually a series of graphs), as further explained with reference to FIG. 6.

The graph generator 140 may include a vertex classifier 142, an arc classifier 144, and a pruner unit 146.

The vertex classifier 142 may be configured to create a vertex (e.g., a marker) for the occurrence, disappearance and/or absence of an individual event 104 or a group of events 104, and arrange the vertices in temporal order of when the event instances (e.g., the occurrence, disappearance and/or absence) have occurred. For example, the vertex classifier 142 may be configured to explore the life cycles of the received events 104 to create vertices, which may be considered markers for when the events 104 come into and out of existence. The vertex classifier 142 may create each vertex based on a certain aspect (also referred to as an event instance) of the event 104 or a group of events 104. Also, the event instance or aspect of the event may be referred to as an event life-cycle incidence, event occurrence marker, or event life-cycle marker. In particular, the vertex classifier 142 may create a vertex based on the creation of the event 104, the closure of the event 104, and/or the absence of the event 104 where a pattern of appearance for the event 104 has been established.

In other words, for each event 104 (or a group of events 104), the vertex classifier 142 may create a vertex that corresponds to the creation of the event 104, another vertex that corresponds to the closure of the event 104, and/or another vertex that corresponds to the absence of the event 104 where a pattern of appearance for the event 104 has been established. According to one specific example, the vertex classifier 142 may create a first vertex based on the creation of a first event 104, and may create a second vertex based on the creation of a second event 104. Also, according to another specific example, the vertex classifier 142 may create the first vertex based on the creation of the first event 104, and a second vertex based on the closure of the first event 104. However, generally, the vertex classifier 142 may create each vertex based on any type of event instance aspect involving one or more of the same or different events 104.

With respect to the absence of the event 104, the vertex classifier 142 may be configured to track the appearance of each event 104, and if the vertex classifier 142 determines that a certain event 104 is repeating according to a pattern, the vertex classifier 142 may create a vertex based on the absence of the repeating event 104 when the established pattern indicates that the absent event 104 should have been repeated.

The arc classifier 144 may be configured to create arcs between at least some of the created vertices based on the temporal distances between the vertices. In one embodiment, the arc classifier 144 may place an arc between temporally adjacent vertices. For example, if the second vertex is temporally adjacent to the first vertex, the arc classifier 144 may create an arc between the first vertex and the second vertex. Also, the arc classifier 144 may be configured to annotate each arc with a coefficient value. The coefficient value may represent the level of connectivity between the connected vertices.

In one implementation, for the initial set of events 104, the arc classifier 144 may create arcs between temporally adjacent vertices, and annotate each arc with a relatively low coefficient value since repeat patterns of behavior have not necessarily been established. Subsequently, the arc classifier 144 may strengthen or weaken the arcs by adjusting the coefficient value to one of a higher value or a lower value depending on the analysis of other subsequently received events 104.

Also, according to one embodiment, each arc may be associated with a time limit, and the time limit may be dependent upon the coefficient value. For example, if an arc includes a relatively high coefficient value (e.g., indicating a strong connection between connected vertices), the time limit associated with this arc may be relatively high. Alternatively, if the arc includes a relatively low coefficient value (e.g., indicating a weak connection between connected vertices), the time limit associated with this arc may be relatively low.

The pruner unit 146 may be configured to remove the arcs from the graph when their corresponding time limits have been exhausted (or expired). Also, the pruner unit 146 may be configured to remove a vertex when the vertex is not connected to any other vertices.

Figure 4:
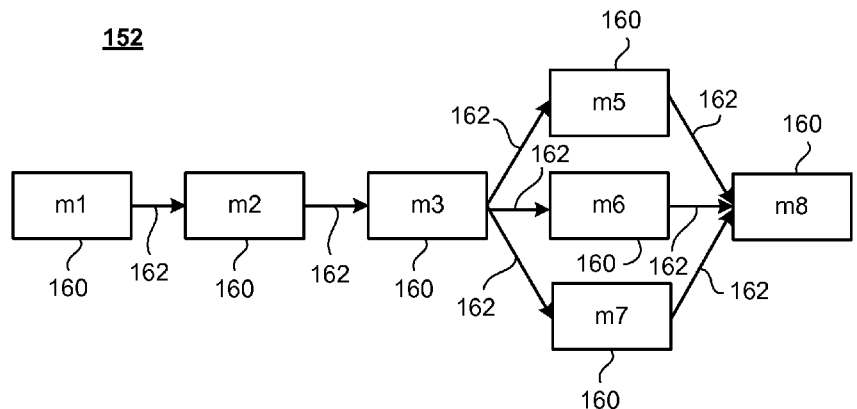
FIG. 4 illustrates an example of an initial graph generated by a graph generator of the causal relationship detector of FIGS. 1 and 3 according to an embodiment.

FIG. 4 illustrates an example of the graph 152 generated by the graph generator 140 using an initial set of events 104 according to an embodiment. For example, the initial graph 152 includes a plurality of vertices 160 (e.g., vertices m1, m2, m3, m5, m6, m7 and m8), and a plurality of arcs 162 that are connected between temporally-adjacent vertices 160. Each of the vertices 160 may represent a particular aspect of an event 104 (or a group of events 104) such as the creation of the event 104, the closure of the event 104, and/or the absence of the event 104 where a pattern of appearance for the event 104 has been established. Continuing with the above example, the initial graph 152 may represent the situation of where a run-away process on the middle tier 128 of the third solution stack 124-3 affects the response time of the web server 126 on the second solution stack 124-2.

In this example, vertex m1 may represent the creation of an event 104 for the system's utilization being over 90% for the middle tier 128 of the third solution stack 124-3, vertex m2 may represent the creation of an event 104 for the database write exceeding the baseline for the middle tier 128 of the first solution stack 124-1, the vertex m3 may represent the creation of an event 104 for the web server response exceeding a threshold time for the web server 126 of the second solution stack 124-2, the vertex m5 may represent the creation of an event 104 for the presence of a new storage drive within the first disk pool 132-1, the vertex m6 may represent the creation of an event 104 for the database write exceeding the baseline for the middle tier 128 for the first solution stack 124-1, the vertex m7 may represent the creation of an event 104 for the web server response exceeding a threshold time for the web server 126 of the third solution stack 124-3, and the vertex m8 may represent the creation of an event 104 for a big data analysis entry.

As such, the vertex classifier 142 may receive the initial set of events 104, generate the vertices 160 (m1, m2, m3, m5, m6, m7, and m8) based on the initial set of events 104, and arrange these vertices 160 according to the temporal order of when the event instances (e.g., creation, closure, or absence) of the events 104 have occurred.

Also, the vertex classifier 142 may assign the same vertex identification information (e.g., m1) for each unique occurrence of the event 104. For example, the vertex classifier 142 may assign "m1" for each vertex 160 relating to the creation of the event 104 for the system's utilization being over 90% for the middle tier 128 of third solution stack 124-3. It is noted that the vertex identification information may be any type of value(s) such as numeric and/or alphabetic value(s) that identify a created vertex 160.

The arc classifier 144 may create the arcs 162 between at least some of the vertices 160 based on the temporal distances between the vertices. For example, the arc classifier 144 may place an arc 162 between temporally adjacent vertices 160. In one example, since the vertex m2 is temporally adjacent to the vertex m1, the arc classifier 144 may create the arc 162 between the vertex m1 and the vertex 2.

Also, the arc classifier 144 may be configured to annotate each arc 162 with a coefficient value that represents the level of connectivity between two vertices 160. Because the graph 152 is the initial graph, the arc classifier 144 may annotate each arc 162 with a relatively low coefficient value (e.g., a starting-coefficient value), and then may adjust the coefficient values of the arc 162 when subsequent sets of events 104 are analyzed. For example, the arc classifier 144 may be configured to strengthen or weaken the coefficient values of the arcs 162 based on an analysis of subsequently received events 104, as further explained below. However, at this point, it may be too early in the process for the causal relationship detector 106 to detect the causal relationships 147 (e.g., one or more the coefficient values are not high enough yet).

Referring back to FIG. 3, the discoverer 138 may receive a subsequent set of events 104. The graph generator 140 may be configured to update the graph 152 based on the set of secondary events 104. For example, the graph generator 140 may update the graph 152 based on the set of secondary events 104 by generating the graph 154, which is explained with reference to FIG. 5.

Figure 5:
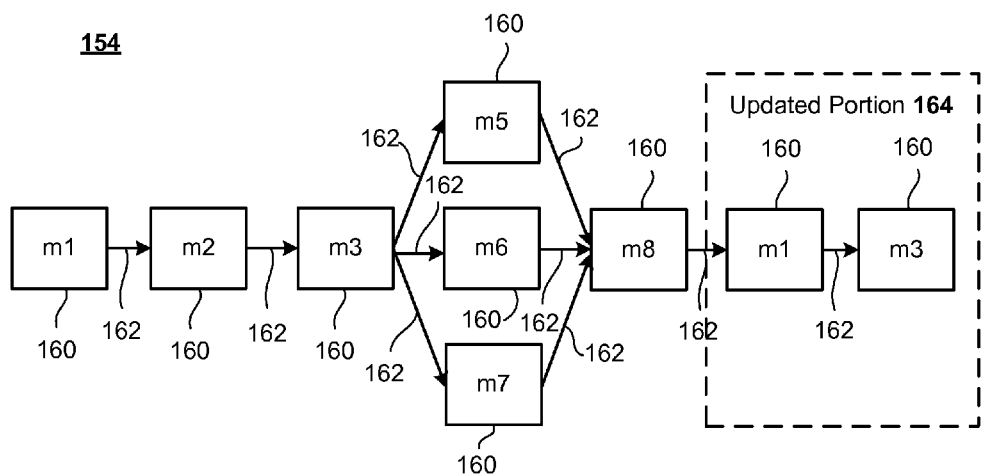
FIG. 5 illustrates an example of an updated graph generated by the graph generator of the causal relationship detector of FIGS. 1 and 3 according to an embodiment.

FIG. 5 illustrates an example of the updated graph 154 generated by the graph generator 140 using the secondary set of events 104 according to an embodiment. In this example, the updated graph 154 includes the initial graph 152 and an updated portion 164 corresponding to the secondary set of events 104. In this example, the graph generator 140 may receive any previous determined graphs (e.g., the initial graph 152), and update the previous determined graphs with the new set of events 104. For example, the vertex classifier 142 may create each vertex 160 for the new set of events 104 based on the creation of the new event 104, the closure of the new event 104, and/or the absence of the new event 104 where a pattern of appearance has been established, as previously described above. Then, the vertex classifier 142 may group the newly created vertices 160 according to its temporal order of when the aspects of the events 104 have occurred.

Referring to the updated portion 164, the vertex classifier 142 has created the vertex m1 and the vertex m3, and placed them in their appropriate temporal order within the updated graph 154. In this case, the creation of the event 104 for the system's utilization being over 90% for the middle tier 128 of third solution stack 124-3 has repeated. Further, the creation of the event 104 for the web server response exceeding a threshold time for the web server 126 of the second solution stack 124-2 has repeated.

As such, the vertex classifier 142 has assigned the creation of the event 104 for the system's utilization being over 90% for the middle tier 128 of third solution stack 124-3 as the m1 vertex, and the creation of the event 104 for the web server response exceeding a threshold time for the web server 126 of the second solution stack 124-2 as the m3 vertex. As indicated above, the vertex classifier 142 will assign the same vertex identification information for each unique occurrence of an event 104, e.g. the creation of the event 104 for the system utilization being over 90% for the middle tier 128 of third solution stack 124-3 will always be identified as m1.

Because the vertex m1 and the vertex m3 have previously appeared in a close chronological order, the new connection may be stronger than the previous connection. This may be considered the beginning of a causal relationship 147. In more detail, the arc classifier 144 may be configured to strengthen the coefficient value of the arc 162 between the vertex m1 and the vertex m3 within the updated portion 164 to a higher coefficient value because the vertex m1 and the vertex m3 have previously appeared in a close chronological order. Alternatively, the arc classifier 144 may be configured to weaken the coefficient value of the arc 162 between the vertex m1 and the vertex m3 within the updated portion 164 to a lower coefficient if the vertex m1 and the vertex m3 have not previously appeared in a close chronological order.

More generally, the arc classifier 144 may strengthen or weaken the arcs 162 of the graph based on the presence or absence of a repeat pattern of vertices 160 associated with the secondary set of events 104. For example, the arc classifier 144 may strengthen or weaken the coefficient value of the arcs 162 based on whether pairs of the same vertices 160 have occurred earlier in chronological order, and/or whether pairs of the same vertices 160 have occurred earlier in reverse-chronological order.

In order to determine a repeat pattern of vertices 160, the arc classifier 144 may search the graph 154 (or the graph 152) for a match using a search pattern that specifies at least two newly created temporally adjacent vertices 160. In one example, the arc classifier 144 may search the graph 154 with the search pattern "m1.*m3." Generally, the arc classifier 144 may utilize any type of searching algorithm known in the art for searching graphs.

However, according to one implementation, the arc classifier 144 may leverage the assigned vertex identification information of the vertices 160. For example, each vertex 160 may be assigned a string representation that is unique to the device's attribute that generated the condition for the vertex 160 to appear in the first place, and that if such condition were to appear at a later time, the same unique string will be assigned to the newly created vertex 160. As such, the arc classifier 144 may concatenate the string representations for the newly created temporal adjacent vertices (e.g., combining m1 with m3), thereby creating a search string representation (e.g., "m1.*m3), which can be searched relatively quickly in the order of O(n).

With respect to a particular example, the arc classifier 144 may determine a search pattern based on the newly created temporally adjacent vertices 160 in the updated portion 164. For example, the arc classifier 144 may determine a search pattern for determining whether the vertex m1 and the vertex m3 have previously appeared in chronological order (or reverse chronological) by concatenating the value string for the vertex m1 (e.g., m1) and the value string for the vertex m3 (e.g., m3), thereby creating the search pattern as "m1.*m3". Then, the arc classifier 144 may search the graph 154 for a match that meets the search pattern of "m1.*m3". If a match is found, the arc classifier 144 may be configured to strengthen the coefficient value of the arc 162 between the vertex m1 and the vertex m3 in the updated portion 164.

In addition, the arc classifier 144 may adjust the coefficient values of the arcs 162 based on one or more existing relationship models 105. The arc classifier 144 may receive one or more existing relationship models 105 that have been obtained from the discoverer 138, and then identify the entities within these one or more existing relationship models 105 that correspond to the entities associated with the vertices 160 on the graph(s). If the entities associated with temporally adjacent vertices 160 have an existing known relationship as specified by the relationship model 105, the arc classifier 144 may strengthen the arc 162 between these temporally adjacent vertices 160 by increasing its coefficient value to a higher value. Further, according to one example, the increased amount may be dependent upon the strength of the existing known relationship model 105.

Each arc 162 may be associated with a time limit, and the time limit may be dependent upon the coefficient value. For example, if an arc 162 includes a relatively high coefficient value (e.g., indicating a strong connection between connected vertices 160), the time limit associated with this arc 162 may be relatively high. Alternatively, if the arc 162 includes a relatively low coefficient value (e.g., indicating a weak connection between connected vertices 160), the time limit associated with this arc 162 may be relatively low.

The pruner unit 146 may be configured to remove the arcs 162 from the graph 154 when their corresponding time limits have been exhausted (or expired). Also, the pruner unit 146 may be configured to remove a vertex 160 when the vertex 160 is not connected to any other vertices 160. These aspects of the pruner unit 146 may be illustrated in FIG. 6.

Figure 6:
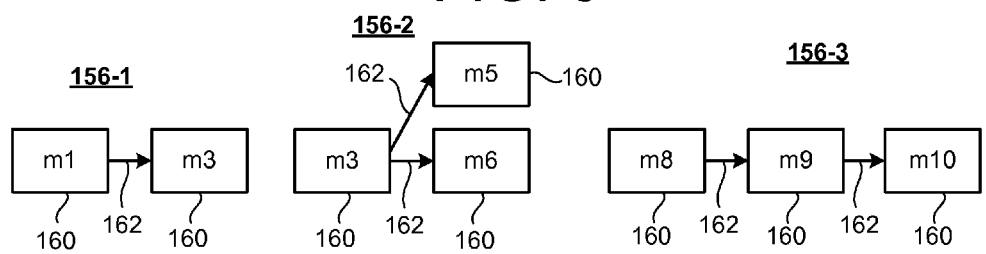
FIG. 6 illustrates an example of a series of graphs generated by the graph generator of the causal relationship detector of FIGS. 1 and 3 according to an embodiment.

FIG. 6 illustrates an example of a series of graphs 156 generated by the graph generator 140 after analyzing additional events 104 over a period of time according to an embodiment. For example, over time, what was once a single graph (e.g., graph 152), becomes a collection of shorter graphs 156 such as a first graph 156-1, a second graph 156-2, and a third graph 156-3. For example, because the pruner unit 146 has removed exhausted or expired arcs 162 and vertices 160, the initial graph 152 may eventually become a collection of shorter graphs.

As indicated above, the causal relationship detector 106 may be configured to periodically execute the causal relationship analysis when a new batch of events 104 is generated by the computing environment 102. After multiple executions, the graph generator 140 may eventually obtain the series of graphs 156, which may indicate relatively strong connections between the connected vertices 160.

For example, the first graph 156-1 includes the vertex m1 connected to the vertex m3 via the arc 162, the second graph 156-2 includes the vertex m3 connected to the vertex m5 and the vertex m6 via the arcs 162, and the third graph 156-3 includes the vertex m8 connected to the vertex m9 via the arc 162, and the vertex m9 connected to the vertex m10 via the arc 162. According to one embodiment, the coefficient value associated with each of the arcs 162 in the graphs 156 may be higher than a threshold value. For example, the coefficient value of a corresponding arc 162 being higher than the threshold value may indicate that a causal relationship between two connected vertices 160 exists because the connection is relatively strong. As such, the graph generator 140 may determine the causal relationships 147 from the series of graphs 156.

Figure 7:
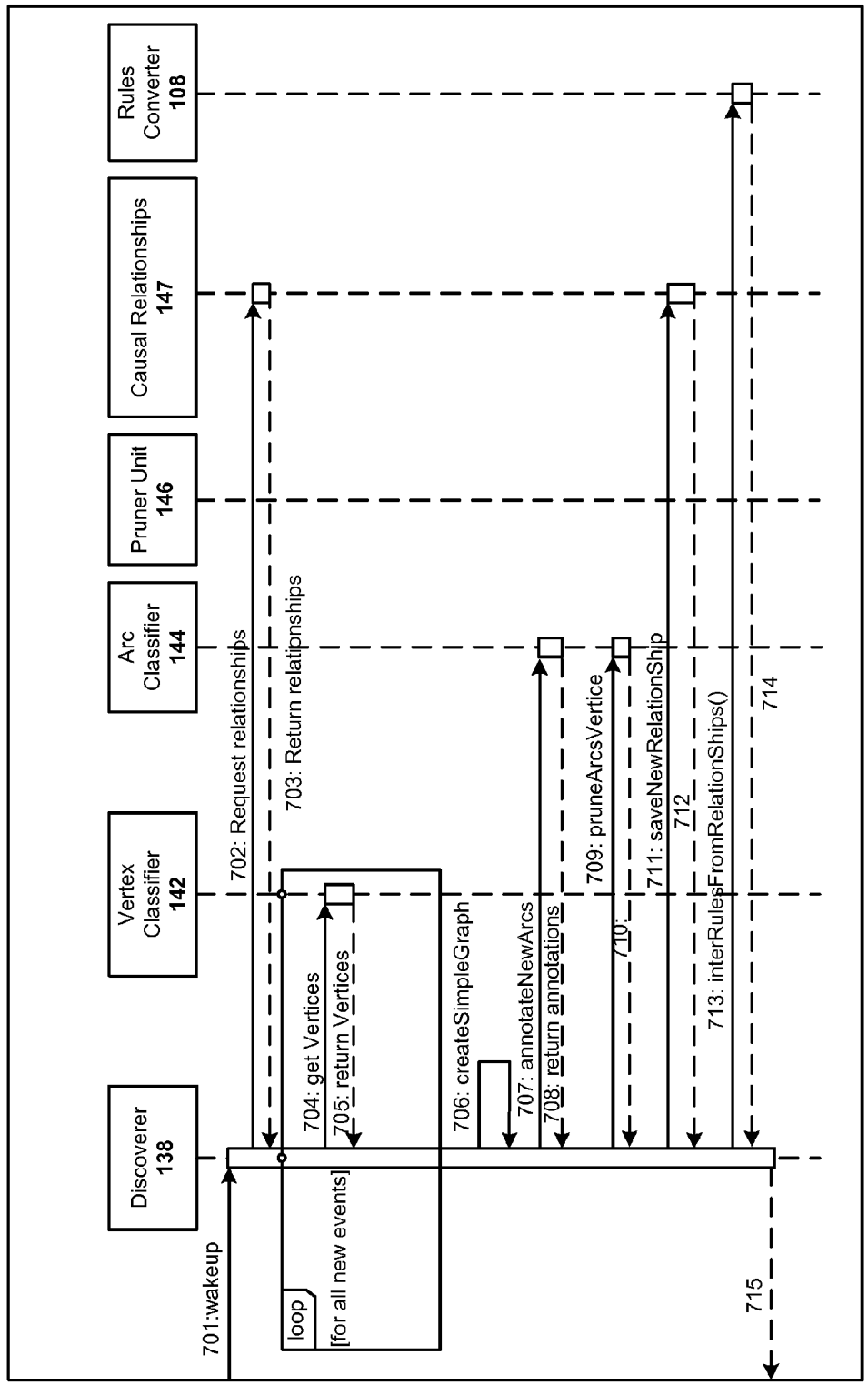
FIG. 7 illustrates a sequence diagram depicting example operations of the management system of FIG. 1 according to an embodiment.

FIG. 7 illustrates a sequence diagram depicting example operations of the management system 100 of FIG. 1 according to an embodiment.

In operation 701, the discoverer 138 starts the casual relationship analysis for a set of newly received events 104. In operations 702 and 703, the discoverer 138 requests and receives any previous determined relationship information indicating a potential causal relationship 147 such as the initial graph 152. In operations 704 and 705, the discoverer 138 requests and receives created vertices 160 corresponding to the set of newly received events 104 from the vertex classifier 142.

The vertex classifier 142 may be configured to create a vertex 160 (e.g., a marker) for the occurrence, disappearance and/or absence of an individual event 104 or a group of events 104 within the set of newly received events 104. For example, the vertex classifier 142 may be configured to explore the life cycles of the received events 104 to create the vertices 160, which may be considered markers for when the events 104 come into and out of existence.

In other words, the vertex classifier 142 may create each vertex 160 based on a certain aspect (also referred to as an event instance) of the event 104 or a group of events 104. The vertex classifier 142 may create a vertex 160 based on the creation of the event 104, the closure of the event 104, and/or the absence of the event 104 where a pattern of appearance for the event 104 has been established. Then, the vertex classifier 142 may arrange the vertices 160 in temporal order of when the event instances (e.g., the occurrence, disappearance and/or absence) have occurred.

In operation 706, the graph may be created such as the graph 152, the graph 154, and/or the graph 156. In operations 707 and 708, the discoverer 138 may request and receive arc information from the arc classifier 144.

For example, the arc classifier 144 may be configured to create arcs 162 between at least some of the created vertices 160 based on the temporal distances between the vertices 160. In one embodiment, the arc classifier 144 may place an arc 162 between temporally adjacent vertices 160. Also, the arc classifier 144 may be configured to annotate each arc with a coefficient value. The coefficient value may represent the level of connectivity between the connected vertices 160. As described above, the arc classifier 144 may create, strengthen and/or weaken the arcs 162 based on whether vertices 160 are temporally adjacent, whether pairs of same vertices 160 have occurred earlier in chronological order, whether pairs of same vertices 160 have occurred earlier in reverse-chronological order, and/or whether vertices 160 match to any existing relationship models 105.

In operations 709 and 710, the discoverer 138 may request and receive pruner information for the pruner unit 146. For example, each arc 162 may be associated with a time limit, and the time limit may be dependent upon the coefficient value. For example, if an arc 162 includes a relatively high coefficient value (e.g., indicating a strong connection between connected vertices 160), the time limit associated with this arc 162 may be relatively high. Alternatively, if the arc 162 includes a relatively low coefficient value (e.g., indicating a weak connection between connected vertices 160), the time limit associated with this arc 162 may be relatively low. The pruner unit 146 may be configured to remove the arcs 162 from the graph 154 when their corresponding time limits have been exhausted (or expired). Also, the pruner unit 146 may be configured to remove a vertex 160 when the vertex 160 is not connected to any other vertices 160.

In operations 711 and 712, the discoverer 138 may save the causal relationships 147. In operations 713 and 714, the discoverer 138 may obtain behavioural rules from the rules converter 108. For example, the rules converter 108 may receive the causal relationships, and may convert one or more of the causal relationships into at least one behavioral rule indicating a causal relationship between at least two entities. According to one aspect, the rules converter 108 may be configured to map the connected vertices 160 (e.g., a first vertex 160 being connected to a second vertex 160 with its connection strength above a threshold value) to the entities that generated the conditions for the connected vertices 160 to appear in the first place.

The rules converter 108 may generate an obligation concerning a certain action to be taken when characteristics of an entity (or group of entities) satisfies a condition (e.g., an entity's utilization is at 100%) in order to alleviate the effect on the computing system 102 produced by the linked entity (e.g., slow response time on the web server) when the condition is satisfied since it is known from the causal relationship that these entities are linked in such a manner. The rules converter 108 may determine any type of action that attempts to alleviate the effect on the computing environment 102 such as reassigning computing resources, transmitting a notification to interested parties, disabling certain computing resources, adding certain computing resources, etc. However, the embodiments encompass any type of action that may be taken within the computing environment 102. Then, in operation 715, the determined behavioral rule may be provided to the behavioral rules database 110.

Figure 8:
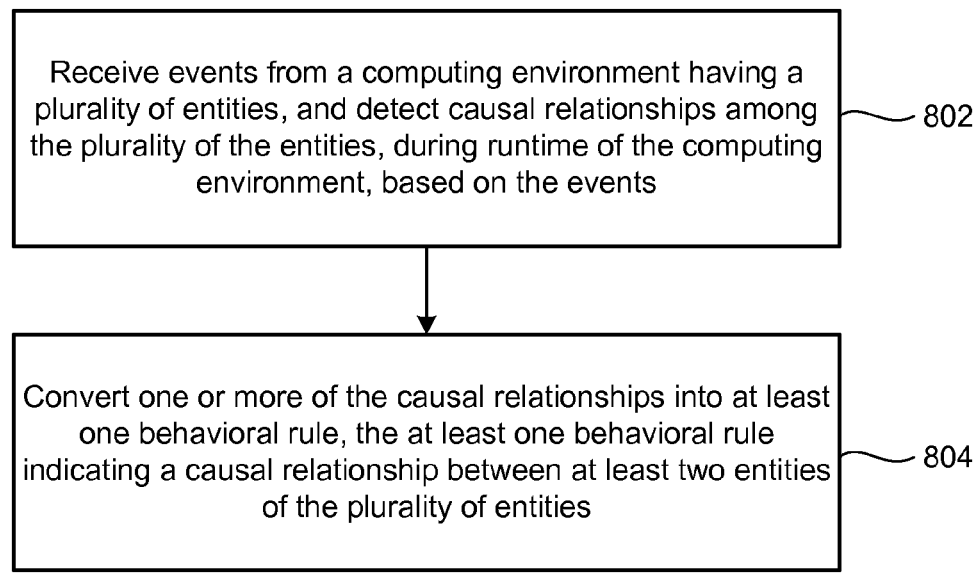
FIG. 8 is a flowchart illustrating example operations of the management system of FIG. 1 according to an embodiment.

FIG. 8 is a flowchart illustrating example operations of the management system 100 of FIG. 1 according to an embodiment. Although FIG. 8 is illustrated as a sequential, ordered listing of operations, it will be appreciated that some or all of the operations may occur in a different order, or in parallel, or iteratively, or may overlap in time.

Referring to FIG. 8, events may be received from a computing environment having a plurality of entities, and causal relationships may be detected among the plurality of entities, during runtime of the computing environment, based on the events (802). For example, referring back to FIG. 1, the causal relationship detector 106 may be configured to receive the events 104 from the computing environment 102 having a plurality of entities.

The computing environment 102 may be configured to generate events 104 during runtime of the computing environment 102. For example, the computing environment 102 may create and collect many types of events 104 as a consequence of the computing environment 102 being included in the management system 100. These generated events 104 may be stored in a database associated with the computing environment 102 and/or the management system 100.

The computing environment 102 may include a plurality of entities, where the plurality of entities may include logical and physical entities. For example, the entities may be computer systems, computer components, hardware/software resources, processors, web servers, application servers, databases, virtual machines, storage devices, applications, operating systems, or generally any type of component that can be used within computing systems. Also, the entities of the computing environment 102 may be part of the same system or may be distributed across many different systems. In this context, the entities of the computing environment 102 may belong to different systems having different administrators.

The causal relationship detector 106 may be configured to detect the causal relationships among the plurality of entities, during runtime of the computing environment 102, based on the events 104.

For example, the causal relationship detector 106 may periodically analyze sets of events 104 that are generated by the computing environment 102, and, based on the occurrence/disappearance/absence of these events 104, the causal relationship detector 106 may determine and track repeat patterns of behavior associated with the entities that generated these event instances. Then, the causal relationship detector 106 may detect the causal relationships among the entities of the computing environment 102 using the determined patterns of behavior. For example, the causal relationship detector 106 may determine that every time an occurrence of a first event 104 (produced by a first entity) has occurred, this occurrence is usually followed by an occurrence of a second event 104 (produced by a second entity) within a relatively short time interval. In this case, the causal relationship detector 106 may determine that the first entity is causally linked to the second entity, e.g., a causal relationship exists between the first entity and the second entity.

The causal relationship detector 106 may create one or more graphs using the received events 104. The graphs may be directed graphs, acyclic directed graphs, or generally any type of graphical representation plotting elements and connections between elements. In one example, the causal relationship detector 106 may create a vertex (e.g., a marker) for the occurrence, disappearance and/or absence of an individual event 104 or a group of events 104, arrange the vertices in temporal order of when the event instances (e.g., the occurrence, disappearance and/or absence) have occurred, and place arcs between temporally adjacent vertices. Also, it is noted that although this disclosure describes the graphs in terms of vertices and arcs, other similar graphical elements may be used to represent this information such as nodes, points, objects, elements, lines, edges, arrows, connections, and links, for example.

The causal relationship detector 106 may annotate each arc with a coefficient value that represents the level of causal connectivity between two vertices. In one example, when the causal relationship detector 106 processes an initial set of events 104, the causal relationship detector 106 may create arcs between temporally adjacent vertices, and annotate each arc with a relatively low coefficient value since repeat patterns of behavior have not necessarily been established. Subsequently, the causal relationship detector 106 may strengthen or weaken the arcs by adjusting the coefficient value to one of a higher value or a lower value depending on the analysis of other subsequently received events 104.

As such, over time, as the causal relationship detector 106 periodically receives more and more events 104 from the computing environment 102, the causal relationship detector 106 may be able to determine repeat patterns of vertices (e.g., whether pairs of the same vertices have previously occurred in some type of order), and then may update the one or more graphs by strengthening or weakening the coefficient values of the arcs based on a presence or absence of the repeat patterns of vertices, and removing exhausted arcs and vertices from the graphs.

Once the coefficient value of an arc exceeds a threshold value, the causal relationship detector 106 may determine that a causal relationship exists between the connected vertices (e.g., a first vertex and a second vertex with an arc having a coefficient value exceeding a threshold value). The existence of the causal relationship between the connected vertices implies that the entity associated with the creation of the first vertex, and the entity associated with the creation of the second vertex, are causally linked.

Referring to FIG. 8, one or more of the causal relationships may be converted into at least one behavioral rule, where the at least one behavioral rule indicates a causal relationship between at least two entities of the plurality of entities (804). For example, referring back to FIG. 1, the rules converter 108 may be configured to convert one or more of the causal relationships into at least one behavioral rule, where the at least one behavioral rule indicates a causal relationship between at least two entities of the plurality of entities.

The rules converter 108 may be configured to map the connected vertices (e.g., a first vertex being connected to a second vertex with its connection strength above a threshold value) to the entities that generated the conditions for the connected vertices to appear in the first place. Also, based on the causal relationships, the rules converter 108 may be configured to generate one or more behavioral rules, where each behavioral rule may specify a condition and an action to be taken in the situation that the condition is satisfied.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. A management system for determining causal relationships among system entities, the management system comprising:
   at least one processor;
   a non-transitory computer-readable storage medium including instructions executable by the at least one processor, the instructions configured to implement, a discoverer configured to periodically start a causal relationship analysis, a causal relationship detector configured to receive events from a computing environment having a plurality of entities upon start of the causal relationship analysis, the causal relationship detector configured to detect causal relationships among the plurality of entities, during runtime of the computing environment, based on the events;

a rules converter configured to convert one or more of the causal relationships into at least one behavioral rule, the at least one behavioral rule indicating a causal relationship between at least two entities including a first entity and a second entity; and a rule implementer configured to receive performance metrics from the first entity and to apply the performance metrics to the at least one behavioral rule, wherein, when the performance metrics satisfies a condition specified by the at least one behavioral rule, the rule implementer is configured to initiate implementation of an action to alleviate an effect on the computing environment produced by the second entity causally linked to the first entity.

2. The management system of claim 1, wherein the causal relationship detector includes:

a graph generator configured to generate one or more graphs based on the events, each graph including vertices and arcs connecting temporally adjacent vertices, each vertex representing an event instance of one or more events, and each arc representing a level of causal connectivity between at least two vertices, wherein the causal relationship detector is configured to detect the causal relationships based on the one or more graphs, wherein at least two connected vertices represents the causal relationship between a set of entities.

3. The management system of claim 1, wherein the causal relationship detector is configured to detect the causal relationships without using an existing relationship model.

4. The management system of claim 1, wherein the causal relationship detector includes a graph generator configured to generate a graph based on the events, the graph generator including:

a vertex classifier configured to create vertices based on an initial set of events including a first vertex, a second vertex, and a third vertex, the vertex classifier further configured to arrange the first vertex, the second vertex, and the third vertex in chronological order; and an arc classifier configured to create arcs between temporally adjacent vertices including a first arc connected between the first vertex and the second vertex and a second arc connected between the second vertex and the third vertex, wherein the arc classifier is configured to annotate each arc with a coefficient value representing a level of connectivity between the temporally adjacent vertices.

5. The management system of claim 4, wherein the arc classifier is configured to receive a relationship model providing at least one known relationship between the plurality of entities, and the arc classifier is configured to strengthen at least one arc of the graph based on the at least one known relationship.

6. The management system of claim 4, wherein the graph generator is configured to update the graph based on a secondary set of events, wherein the arc classifier is configured to strengthen or weaken the arcs of the graph based on, in part, a presence or absence of a repeat pattern of vertices associated with the secondary set of events.

7. The management system of claim 6, wherein each vertex is represented by a string representation, and the arc classifier is configured to analyze the repeat pattern of vertices by searching the graph for a match with a search pattern that includes a concatenation of string representations corresponding to at least two temporally adjacent vertices associated with the secondary set of sets.

8. The management system of claim 6, wherein each arc is associated with a time limit and the time limit is dependent upon the coefficient value, wherein the causal relationship detector further includes:

a pruner unit configured to remove at least one arc from the graph when the time limit associated with the at least one arc has been exhausted, wherein the pruner unit is configured to remove at least one vertex when the at least one vertex is not connected to any other vertex.

9. A non-transitory computer-readable medium storing instructions that when executed cause at least one processor to determine causal relationships among system entities, the instructions comprising instructions to:

periodically start a causal relationship analysis;

receive events from a computing environment having a plurality of entities upon start of the causal relationship analysis;

detect causal relationships among the plurality of entities, during runtime of the computing environment, based on the events;

convert one or more of the causal relationships into at least one behavioral rule, the at least one behavioral rule indicating a causal relationship between at least two entities including a first entity and a second entity;

receive performance metrics from the first entity;

apply the performance metrics to the at least one behavioral rule; and when the performance metrics satisfies a condition specified by the at least one behavioral rule, initiate implementation of an action to alleviate an effect on the computing environment produced by the second entity causally linked to the first entity.

10. The non-transitory computer-readable medium of claim 9, wherein the instructions to detect causal relationships among the plurality of entities, during runtime of the computing environment, based on the events includes instructions to:

generate one or more graphs based on the events, each graph including vertices and arcs connecting temporally adjacent vertices, each vertex representing an event instance of one or more events, and each arc representing a level of causal connectivity between at least two vertices; and detect the causal relationships based on the one or more graphs, wherein at least two connected vertices represents the causal relationship between a set of entities.

11. The non-transitory computer-readable medium of claim 9, further comprising:

receive performance metrics from a first entity of the plurality of entities;

apply the performance metrics to the at least one behavioral rule, wherein, when the performance metrics satisfies a condition specified by the at least one behavioral rule, determine an action to alleviate an effect on the computing environment produced by a second entity of the plurality of entities, wherein the action includes adding or reassigning computer resources to at least one of the first entity and the second entity.

12. The non-transitory computer-readable medium of claim 9, wherein the instructions to detect causal relationships among the plurality of entities, during runtime of the computing environment, based on the events includes instructions to:
generate a graph including:
create vertices based on an initial set of events including a first vertex, a second vertex, and a third vertex, and arrange the first vertex, the second vertex, and the third vertex in chronological order;
create arcs between temporally adjacent vertices including a first arc connected between the first vertex and the second vertex and a second arc connected between the second vertex and the third vertex; and
annotate each arc with a coefficient value representing a level of connectivity between the temporally adjacent vertices.

13. The non-transitory computer-readable medium of claim 12, wherein the instructions further include instructions to:
receive a relationship model providing at least one known relationship between the plurality of entities; and
strengthen at least one arc of the graph based on the at least one known relationship.

14. The non-transitory computer-readable medium of claim 12, wherein the instruction further include instructions to:
update the graph based on a secondary set of events including strengthening or weakening the arcs of the graph based on, in part, a presence or absence of a repeat pattern of vertices associated with the secondary set of events.

15. The non-transitory computer-readable medium of claim 14, wherein each vertex is represented by a string representation, and the instructions to update the graph include:
analyze the repeat pattern of vertices by searching the graph for a match with a search pattern that includes a concatenation of string representations corresponding to at least two temporally adjacent vertices associated with the secondary set of sets.

16. The non-transitory computer-readable medium of claim 14, wherein each arc is associated with a time limit and the time limit is dependent upon the coefficient value, wherein the instructions to update the graph include:

remove at least one arc from the graph when the time limit associated with the at least one arc has been exhausted; and
remove at least one vertex when the at least one vertex is not connected to any other vertex.

17. A method for determining causal relationships among system entities, the method comprising:
periodically starting, by at least one processor, a causal relationship analysis;
receiving, by the at least one processor, events from a computing environment having a plurality of entities upon start of the causal relationship analysis;
detecting, by the at least one processor, causal relationships among the plurality of entities, during runtime of the computing environment, based on the events;
converting, by the at least one processor, one or more of the causal relationships into at least one behavioral rule, the at least one behavioral rule indicating a causal relationship between at least two entities including a first entity and a second entity;
receiving, by the at least one processor, performance metrics from the first entity;
applying, by the at least one processor, the performance metrics to the at least one behavioral rule; and
when the performance metrics satisfies a condition specified by the at least one behavioral rule, initiating implementation of an action, by the at least one processor, to alleviate an effect on the computing environment produced by the second entity causally linked to the first entity a second entity of the plurality of entities.

18. The method of claim 17, wherein the detecting, by the at least one processor, causal relationships among the plurality of entities, during runtime of the computing environment, based on the events includes:
generating one or more graphs based on the events, each graph including vertices and arcs connecting temporally adjacent vertices, each vertex representing an event instance of one or more events, and each arc representing a level of causal connectivity between at least two vertices; and
detecting the causal relationships based on the one or more graphs, wherein at least two connected vertices represents a causal relationship between a set of entities.

19. The method of claim 18, wherein the event instance includes a creation of the one or more events, a closure of the one or more events, or an absence of the one or more events where a pattern of appearance has been established.

* * * * *